US006915258B2

(12) United States Patent
Kontonassios

(10) Patent No.: US 6,915,258 B2
(45) Date of Patent: Jul. 5, 2005

(54) METHOD AND APPARATUS FOR DISPLAYING AND MANIPULATING ACCOUNT INFORMATION USING THE HUMAN VOICE

(76) Inventor: Thanassis Vasilios Kontonassios, 15802 Stonehaven Dr., Houston, TX (US) 77059

( * ) Notice: Subject to any disclaimer, the term of this patent is extended or adjusted under 35 U.S.C. 154(b) by 788 days.

(21) Appl. No.: 09/824,255

(22) Filed: Apr. 2, 2001

(65) Prior Publication Data

US 2002/0143549 A1 Oct. 3, 2002

(51) Int. Cl.[7] .......................... G10L 15/20; G10L 15/26
(52) U.S. Cl. .................. 704/233; 704/235; 704/275
(58) Field of Search ........................... 704/233, 235, 704/270, 275, 276; 715/505, 506, 507, 508, 526

(56) References Cited

U.S. PATENT DOCUMENTS

| 4,559,604 | A |   | 12/1985 | Ichikawa |  |
|---|---|---|---|---|---|
| 4,783,803 | A |   | 11/1988 | Baker |  |
| 5,265,075 | A | * | 11/1993 | Bergeron et al. | 369/25.01 |
| 5,544,298 | A | * | 8/1996 | Kanavy et al. | 345/804 |
| 5,799,279 | A |   | 8/1998 | Gould |  |
| 5,812,977 | A |   | 9/1998 | Douglas |  |
| 5,857,099 | A | * | 1/1999 | Mitchell et al. | 704/235 |
| 6,148,304 | A | * | 11/2000 | de Vries et al. | 707/104.1 |
| 6,347,299 | B1 | * | 2/2002 | Holzman et al. | 704/270 |
| 6,456,274 | B1 | * | 9/2002 | Van Hemert | 704/276 |
| 6,490,550 | B1 | * | 12/2002 | Hiri | 704/201 |
| 6,490,563 | B2 | * | 12/2002 | Hon et al. | 704/260 |
| 6,704,709 | B1 | * | 3/2004 | Kahn et al. | 704/235 |
| 6,721,703 | B2 | * | 4/2004 | Jackson et al. | 704/270 |
| 6,785,650 | B2 | * | 8/2004 | Basson et al. | 704/235 |
| 6,789,060 | B1 | * | 9/2004 | Wolfe et al. | 704/235 |
| 6,832,189 | B1 | * | 12/2004 | Kanevsky et al. | 704/235 |

* cited by examiner

Primary Examiner—Martin Lerner
(74) Attorney, Agent, or Firm—W. Thomas Morrow

(57) ABSTRACT

The present disclosure relates to a computer assisted system which enables a computer user to input data into a computer by using verbal utterances or voice. The present disclosure is more particularly directed to entering data into a computer, where the entered data is associated with a particular account. The present disclosure also relates to user enabled subroutines which are preferably enabled and implemented by voice. The present disclosure also relates to displaying and manipulating account information on a monitor and storing the information for later retrieval, review, and editing. The present disclosure also related to entering data into a computer by replaying a recorded voice.

53 Claims, 6 Drawing Sheets

FIG. 6a

| | |
|---|---|
| ⦿ Account | ▼ |
| ○ Name | |

| | |
|---|---|
| Account: | 320 |
| First Name: | 325 |
| Middle Name: | 330 |
| Last Name: | 335 |
| DOB: | 340 |
| Sex: | 345 |
| Address1: | 350 |
| Address2: | 355 |
| City: | 360 |
| State: | 365 |
| Zip Code: | 370 |
| Work Phone: | 375 |
| Home Phone: | 380 |
| Professional ID: | 385 |
| RefProfID: | 390 |
| Insurance ID: | 395 |
| Insurance ID #: | 400 |
| Client ID: | 405 |

[Add] [Edit] [Delete] [Refresh] [Close]

FIG. 6b

| | |
|---|---|
| ⦿ Account | ▼ |
| ○ Name | |

| | |
|---|---|
| Account: | 320 |
| First Name: | 325 |
| Middle Name: | 330 |
| Last Name: | 335 |
| DOB: | 340 |
| Sex: | 345 |
| Address1: | 350 |
| Address2: | 355 |
| City: | 360 |
| State: | 365 |
| Zip Code: | 370 |
| Work Phone: | 375 |
| Home Phone: | 380 |
| Professional ID: | 385 |
| RefProfID: | 390 |
| Insurance ID: | 395 |
| Insurance ID #: | 400 |
| Client ID: | 405 |

[Update] [Cancel]

METHOD AND APPARATUS FOR DISPLAYING AND MANIPULATING ACCOUNT INFORMATION USING THE HUMAN VOICE

BACKGROUND OF THE INVENTION

1. Field of the Invention

The present invention relates to apparatus and methods for a computer assisted system which enables a computer user to input data and enable and implement a number of subroutines and more particularly, the present invention relates to a computer controlled display system, which is preferably operated by the human voice, for displaying and manipulating account information and associated account data files on a display and storing said information. The present invention also relates to apparatus and methods for retrieving, reviewing, and manipulating the stored account information and data files as required.

2. Description of the Related Art

In today's business environment it is increasingly necessary to enter information into a permanent or an electronic medium, such as a personal computer, to document work performed or observations taken. Typically this documentation takes the form of hand written or transcribed records typed by assistants and stored in filing cabinets, on shelves, or on computer mass storage devices. Typically, each file is also associated with a particular "client" patient, or customer. Each client typically has a particular "account" identifier such as an account number, client initials, or is segregated by the client's last name. These records may also be typed by hand by the author and stored in a similar fashion. Several inefficiencies build up with this approach to records generation and storage. In the case where a professional such as an attorney, doctor, engineer, scientist, technician, or persons with other specialized skills generates hand written records and has them typed by an assistant, many opportunities for errors and delays exist. The hand written notes may not be legible to the assistant, requiring additional communications between the assistant and the professional. If the professional chooses to dictate the records into a recording device or have an assistant use "short hand" notation to record the records, there are still the inefficiencies of having to hand type each word into a record or electronic "file." If the professional chooses to generate the records by typing them directly, the professional's typing skills might not be as proficient as an assistant's and the speed at which the professional speaks is likely much faster than the speed at which the professional types. If there existed a tool that allowed the records to be generated directly from the spoken word into records or files where the records could be electronically associated with a given account, several layers of inefficiencies could be eliminated. The task of generating the records could be reduced to a professional speaking directly "to " the computer and the record being generated in "real time." Errors could be seen immediately and corrected. Alternatively, the records could be stored for later retrieval. The professional or an assistant could recall the records and edit them as required. The professional might also choose to dictate the "data " or record onto a recording device and an assistant could play back the recording into the computer via a microphone or the computer's line input and watch as the record was produced. The assistant could simultaneously listen to the audio from the tape recorder or from the computer's speakers and correct any errors, starting and stopping the replay as necessary. This eliminates issues of typing speed as well as illegible handwriting. This approach would also allow the assistant to complete the file production tasks more efficiently and be available for other tasks as may be required.

There are computer-based tools that allow one to speak and have the spoken word turned into typed text or commands within a computer system. U.S. Pat. No. 4,783,803 is generally directed to a speech recognition system within a computer apparatus allowing matching the spoken word to a stored vocabulary. This invention seeks to provide speech recognition apparatuses and methods that are capable of using language model information to reduce the likelihood of confusion between similar sounding words and to reduce computation. Additionally, U.S. Pat. No. 4,559,604 is generally directed to a machine implemented pattern recognition method for analyzing the spoken word. Likewise, U.S. Pat. No. 5,799,279 is generally directed to continuous speech recognition of text and commands. This invention relates a method for use in recognizing continuous speech where signals are accepted corresponding to interspersed speech elements including text elements corresponding to text to be recognized and command elements corresponding to commands to be executed. Once the signals are accepted, the elements are recognized. The recognized elements are acted on in a manner that depends on whether they represent text or commands. These inventions however do not enter the recognized speech into records associated with a given account. Another example of a speech recognition apparatus related to the disclosed invention is U.S. Pat. No. 5,812,977 which is generally directed to a voice controlled computer interface enabling implementation of common subroutines so as to simplify operation of a computer. This invention however does not pertain to entering spoken data into a computer.

The personal computer is generally described as the combination of a central processing unit (CPU) with an input device such as a keyboard and an output device for viewing computer related information such as a cathode ray tube (CRT) also known as a monitor. The computer monitor is provided with a cathode ray tube (CRT) or flat screen display that provides an image on a screen. The screen typically will assist the user in some fashion by providing what is known as a graphic user interface (GUI) which is typically located on the "desktop". The term "desktop" refers to the marginal edge of the monitor display that is viewed by the user. The GUI is manifest by a number of symbols or other installed components bordering the edge of the viewed screen. The user then performs some task in the central portion of the screen that is, for want of a better word, sometimes known as a "window." If, as an example, the user is executing a word processing package to thereby prepare a short note or even a very long document, the window encloses the written document, and is encircled by the GUI that is at the desktop. The GUI can be displayed at the vertical margins of the window, or at the top or bottom margins of the window, or in any combination thereof. A specific task, such as creating a window within which a document is written by means of a keyboard, is usually initiated by "clicking" the appropriate GUI symbol with a mouse. Once a window is displayed, the user is typically presented with a workspace in the window and a series of "pull down" menus that the user can select to perform specific tasks. When the user selects a pull down menu, a second window appears in which is listed a set of generally related commands. For example, a pull down menu may be identified in the first window with the word "edit." The list of related commands within the second or edit window is generally associated with editing tasks or operations. Pull down menus can also list other information such as a list of files available within a database. The user is also typically presented with "scroll" bars within the displayed window. The scroll bars allow the user to "move" around the contents of a file when these contents cannot be displayed within the boundaries of the displayed window.

Voice activated and voice controlled computer interfaces have been developed for a number of reasons. In very recent years, the computing power and software capabilities did not exist for an efficient voice controlled data entry. The primary reason for the emergence of such technology seems not to be seeking increases in efficiency by increasing the speed at which data can be entered into the computer and saved with associated account information, but rather to free the computer user's hands for the performance of other manual tasks while simultaneously operating a computer.

SUMMARY OF THE INVENTION

A method for entering and displaying data according to the invention comprises generating and displaying a window, generating a first sequence of user utterances for performing an operation, generating a second sequence of user utterances for entering data, receiving said first sequence of user utterances and said second set of user utterances in a microphone, converting said first set of user utterances into a first conditioned input signal and said second set of user utterances into a second conditioned input signal, providing a stored operation vocabulary, providing a stored dictation vocabulary, correlating said first conditioned input signal with elements of said stored operation vocabulary thereby translating said first sequence of user utterances into compatible instructions recognizable by said computer, and correlating said second conditioned input signal with elements of said stored dictation vocabulary thereby translating said second sequence of user utterances into data, displaying said data in said window, providing a plurality of accounts selecting a first account from said plurality of accounts using said first sequence of user utterances, and electronically associating said data with said first account. In one embodiment of the method, the first sequence of user utterances and said second sequence of user utterances are generated using discrete speech. In one embodiment of the method, the first sequence of user utterances and said second sequence of user utterances are generated using continuous speech. In one embodiment of the method, the first sequence of user utterances and said second sequence of user utterances are generated by a live human. In one embodiment of the method, the plurality of accounts is created by said user using said first sequence of user utterances and said second sequence of user utterances. In one embodiment of the method, the plurality of accounts is edited by said user using said first sequence of user utterances and said second sequence of user utterances. In another embodiment of the method the user session can be stored for later playback and as a backup by recording a user session, storing said recording within said computer memory, selecting said user session from said computer memory, providing a database, and selectively replaying said user session through the interface between the computer CPU and the translation unit and back thereby recreating selected portions of said user session.

Another aspect of the invention is a method for entering and displaying data in subwindows. This aspect of the invention includes generating a plurality of subwindows within the boundaries of said window, and displaying said data within the boundaries of one of said subwindows. In another embodiment of the method, the subwindows include a first subwindow or dictation area and a second subwindow or an account information area where the data is displayed in the dictation area and the account information is displayed in the account information area. In another embodiment of the method, the subwindows include a third subwindow for displaying preformatted format files. In anther embodiment of the method the subwindows include a third subwindow for displaying history data.

Another aspect of the invention is a method for entering and displaying data by using a recorded human voice. This aspect of the invention includes recording a second set of user utterances, playing back said recording, and receiving said second set of user utterances using a line input.

Another aspect of the invention is a method for storing data. This aspect of the invention includes providing a database, storing said data in said database, providing a plurality of preformatted format files, storing said format files in said database, selecting one of said preformatted format files using said first sequence of user utterances, displaying said data in said window using said format file, electronically associating one of said preformatted format files with said data, and saving said associating in said database so said data is displayed using the same one of said preformatted format files each time said data is displayed in said window. In another embodiment of the method, the format files can be edited and displayed by selecting a first format file of said preformatted format files, editing said first format file using said first sequence of user utterances and said second sequence of user utterances, storing said edited format file in said database, and displaying said data in said window using said edited format file. In another embodiment of the method the account information and data can be displayed by generating a plurality of subwindows within the boundaries of said window, wherein a first of said subwindows is a dictation area, wherein a second of said subwindows is an account information area, wherein a third of said subwindows is a format selection area, wherein a fourth of said subwindows is a history area, providing a first plurality of hold files, electronically associating said first plurality with a second account of said accounts, providing a second plurality of hold files, electronically associating said second plurality with a third account of said accounts, storing said first plurality of hold files and said second plurality of hold files in said database, selecting a second account of said accounts using said first sequence of user utterances, automatically displaying said second account in said account information area, automatically displaying the history data from said first history file in said history area, and automatically displaying said first plurality of hold files in said format selection area.

A voice controlled computer interface system for entering data into a computer comprises a first sequence of user utterances requiring input by a user in order to perform an operation, a second sequence of user utterances requiring input by a user in order to enter data into a computer, a microphone into which said first sequence of user utterances and said second sequence of user utterances are introduced, a conditioning circuit for forming a first conditioned input signal from said first sequence of user utterances and a second conditioned input signal from said second sequence of user utterances, a stored operation vocabulary, a stored dictation vocabulary; a translation unit for correlating said first conditioned input signal with elements of said stored operation vocabulary thereby creating compatible instructions recognizable by said computer, and for correlating said second conditioned input signal with elements of said stored dictation vocabulary thereby translating said second conditioned input signal into data, a plurality of accounts, said data being electronically associated with a first account of said accounts, said first account being selectable by said first sequence of user utterances, and a window wherein said data is displayed. In one embodiment of the invention, the first sequence of user utterances and said second sequence of user utterances is discrete speech. In one embodiment of the invention, the first sequence of user utterances and said second sequence of user utterances is continuous speech. In one embodiment of the invention, the first sequence of user utterances and said second sequence of user utterances are generated by a live human. In one embodiment of the invention, the plurality of accounts is created by said user using said first sequence of user utterances and said second sequence of user utterances. In one embodiment of the invention, one of said plurality of accounts is edited by said user using said first sequence of user utterances and said second sequence of user utterances. A particular embodiment of the invention includes a plurality of subwindows displayed within the boundaries of said window, and wherein said data is displayed within the boundaries of one of said subwindows. A particular embodiment of the invention includes a recording of a human voice wherein said second sequence of user utterances are generated from the playback of said recording. A particular embodiment of the invention includes a recording of a user session wherein said first sequence of user utterances and said second sequence of user utterances are generated from the playback of said recording.

In still another embodiment of the invention, storing and displaying the data includes a database, a plurality of preformatted format files, wherein said data is electronically associated with a first account of said accounts and a first format of said format files, wherein said data is displayed in said window using said format file each time said data is displayed, wherein said data, said accounts, and said format files are stored within said database, a plurality of sets of data stored within said database, wherein a set of data within said sets is made up of a plurality of saved data files, wherein a first set of said sets is electronically associated with a second account of said accounts, wherein a second set of said sets is electronically associated with a third account of said accounts, and wherein said second account and said third account is selectable by said first sequence of user utterances. A particular embodiment of the invention includes a plurality of history files, wherein a first history file of said history files is electronically associated with a first set of said sets and said second account of said accounts, wherein a second history file of said history files is electronically associated with a second set of said sets and said third account of said accounts, and wherein said first history file and said second history file are stored within said database. A particular embodiment of the invention includes a first plurality of hold files electronically associated with a second account of said accounts, a second plurality of hold files electronically associated with a third account of said accounts, wherein said first plurality of hold files and said second plurality of hold files are stored within said database, a plurality of subwindows displayed within the boundaries of said window, wherein a first of said subwindows is a dictation area, wherein a second of said subwindows is an account information area, wherein a third of said subwindows is a format selection area, wherein a fourth of said subwindows is a history area, wherein a second account of said accounts is selectable using said first sequence of user utterances, and wherein the selection of said second account automatically leads to the display of said second account in said account information area, the history data from said first history file in said history area, and said first plurality of hold files within said format selection area.

BRIEF DESCRIPTION OF THE DRAWINGS

FIG. 6a illustrates one possible account information window for the present invention.

FIG. 6b illustrates one possible account information update window for the present invention.

DETAILED DESCRIPTION

Figure 1:
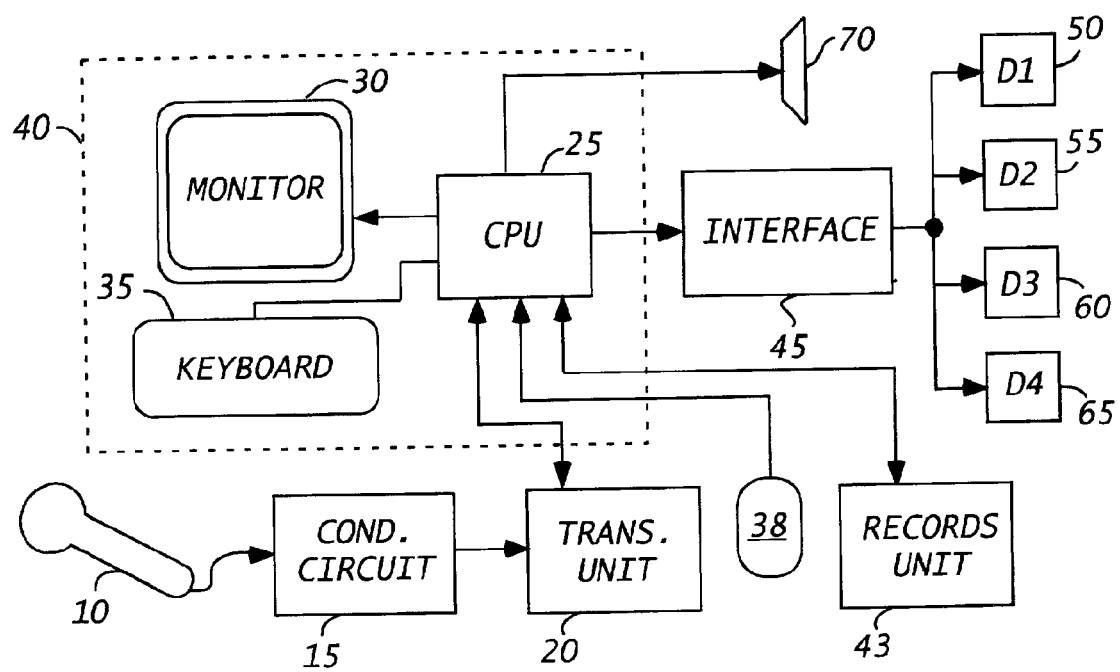
FIG. 1 shows a representative computer system.

FIG. 1 shows a voice controlled computer interface system cooperating with a computer and a plurality of computer output devices. A live human or "user" enters or inputs data into the system preferably by speaking words into a microphone 10. The user might also enter data into the system by recording his spoken words in a recording device such as a tape recorder and playing back the spoken words into microphone 10 or into a "line input" not shown. A line input is an electrical interface with the system that supplies the playback data to the conditioning circuit 15 or directly to the translation unit 20 without necessarily "broadcasting" the playback so the user may hear it. Alternatively, a user "instructs" the system preferably by speaking word or phrase instructions, voice commands, and query answers into microphone 10 where these instructions are interpreted by the system and the system performs a task associated with the interpretation. A user might also choose to record both the spoken words and the user instructions and playback the recording to both enter data and instruct the computer. A user can also enter data or communicate with the system using a combination of the spoken word, keyboard 35 entries, and mouse 38 "clicks." The microphone 10 is electrically connected to a conditioning circuit 15 that converts the acoustic word or words into preferably a digital representation of the spoken word or words. The conditioning circuit 15 also contains suitable amplification means to electrically amplify the digitized words, if necessary. It should be understood that the conditioning circuit 15 can be of the type to convert spoken words into analog rather than digital electrical representation, but digital conversion is preferred. The digitized words are next transferred to a translation unit 20 that attempts to match the digitized spoken words with words contained in a stored vocabulary of words. The stored vocabulary of words can be partitioned into a stored operation vocabulary for performing tasks and a stored dictation vocabulary for word recognition during data entry. As described above, the matching process for distinguishing between spoken voice commands and dictation is well known in the art. The stored vocabulary can reside in a host CPU 25, or can be stored in a separate database memory within the translation unit 20, or can be stored in a central database shared by other systems and other users. A specific action or task instruction is stored with each operation vocabulary word. When a match between a spoken word and an operation vocabulary word is found, then the CPU 25 is instructed, preferably by means of a computer compatible instruction transferred from the transition unit 20, to perform an action or task associated with the recognized word. This process is the basic means by which the user verbally instructs the computer to perform specific tasks or answers specific queries from the computer interface system. All the voice commands necessary for initiating this embodiment's tasks are stored within translation unit 20. Alternatively, when a match between the spoken word and a dictation vocabulary word is found, the CPU 25 outputs data in the form of data or words displayed on the monitor 30 or stored to records unit 43. The stored records database or "records" can reside in host CPU 25 or can be stored in a separate database memory within the records unit 43, or can be stored in a central records database shared by other systems and other users. The central records database can also reside in the same memory as the stored vocabulary, namely translation unit 20.

Still referring to FIG. 1, the CPU 25, a monitor 30, and preferably a keyboard 35 represent the major elements of a "computer" identified as a whole by the numeral 40. As mentioned previously, the computer 40 is preferably a personal computer (PC), but can alternately be any type of programmable computer and is not required to be in any way computer "platform" specific. Two-way communication exists between the CPU 25 and the translation unit 20 so that the word vocabulary can be stored within a database residing in the CPU 25. Two-way communication also exists between the CPU 25 and the records unit 43 so that the records of files can be stored within a database residing in the CPU and retrieved and displayed on monitor 30. The CPU 25 outputs information to an interface circuit 45 which, in turns, interfaces with a plurality of output devices. Four such output devices "D.sub.i (i=1, . . . , 4) are shown and identified with the numerals 50, 55, 60, and 65. These output devices might be printers, fax machines, plotters, mass data storage devices, and the like. As mentioned in previous discussion, the preferred method of data input, task performance or query response is by means of speaking into the microphone 10. Alternately, response can be entered manually by means of the keyboard 35. Also, the system can query the user or verify commands and answers by the user by either audio or visual means. The audio system response is either a tone or a synthesized or recorded voice response emitted through a speaker 70 that is electrically connected to the CPU 25. It should be noted that speaker 70 could also be any device that allows a tone, or a synthesized or recorded voice to be heard by the user. The visual system response is either by text or flashing or highlighted icons displayed on monitor's 30 screen.

This embodiment can also be used to record and play back a human voice. While the user dictates words into microphone 10, the computer 40 can store in its memory or in a mass storage device, the conditioned signals from conditioning circuit 15 for later retrieval. When the user desires, the user can use voice commands to initiate the playback or broadcast of the recorded signals through speaker 70. The playback can also be done through speaker 70 and simultaneously through the CPU 25 to the translation unit 20 where the translation unit 20 "interprets" the playback as dictated words or data, or commands and sends this information back to CPU 25 for display or initiation. The user can then command the computer to start and stop this recording as needed so during playback, the user or an assistant can make corrections to the data as it is displayed. This allows the user to have an electronic "copy" of both commands and data that were spoken so if the computer 40 loses power or for some other reason loses the saved records or files generated by the user, the user can recreate the lost work.

Figure 2:
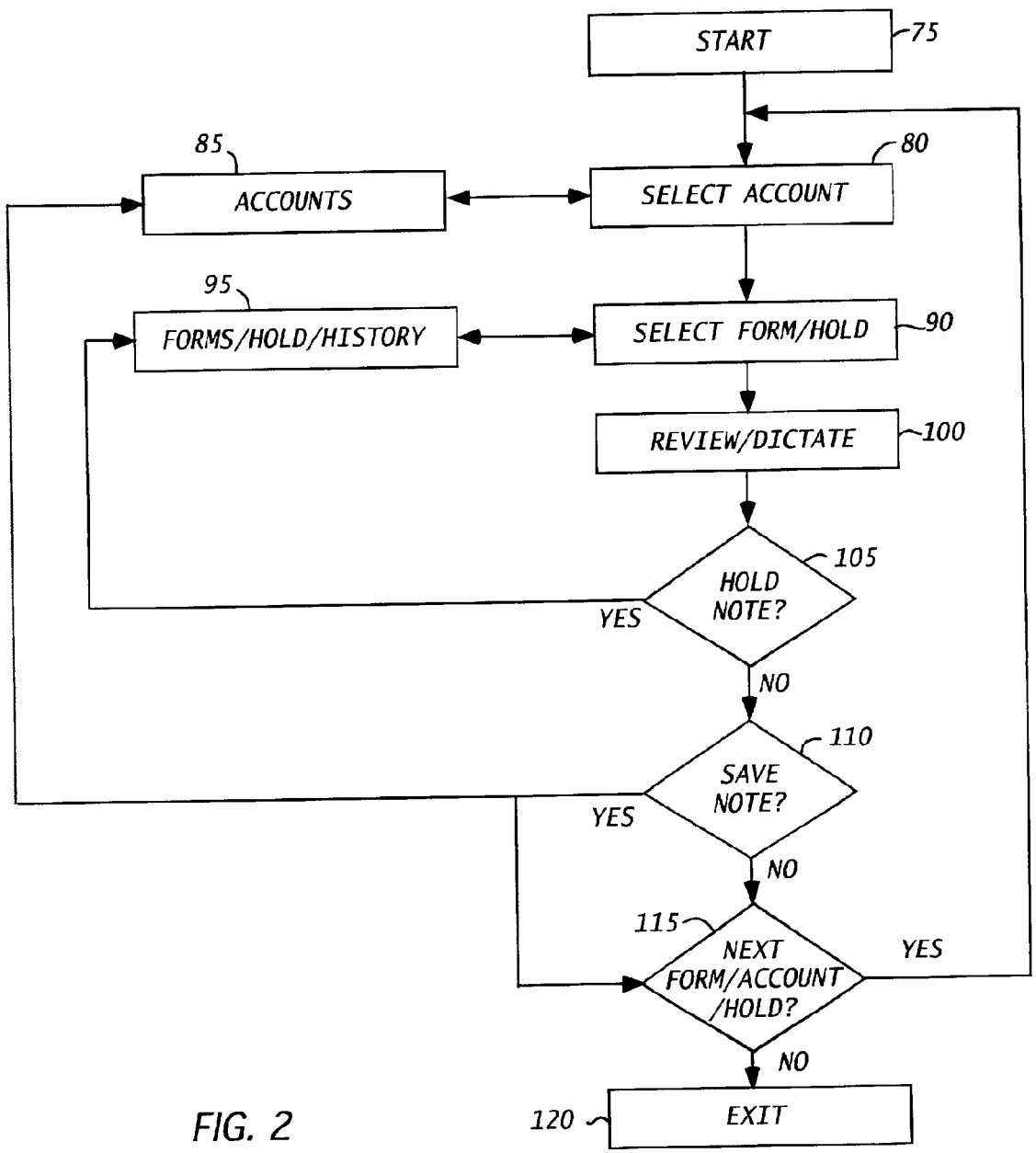
FIG. 2 is a functional block diagram illustrating one possible computer display system incorporating the teachings of the present invention.

FIG. 2 shows the logical algorithm associated with one embodiment of the invention herein disclosed. In this embodiment, the user initiates the start 75 by using mouse 38 in FIG. 1 and clicking on a GUI present on the computer's desktop which is linked to a computer program preferably stored within the computer's CPU 25 or retrieved from a mass storage device and operated on within the computer's CPU 25 shown in FIG. 1. Alternatively, the user preferably uses voice commands as described in FIG. 1 above to command or initiate all the actions in this logical sequence. Start 75 "launches" the program and begins a "user session." A user session is defined as the time between initiating the start 75 and initiating the exit 120. After starting at 75, the user chooses an account by initiating select account 80. An account is a unique identifier that is associated with a particular client and is stored in an account file in stored accounts 85. Also electronically associated with a particular account is all the stored data associated with that particular client such as names, addresses, any saved "data" files, hold files or any other electronic records. It is noted that an account can also be associated with a number of clients if the user wishes to save data on new clients without creating a unique account for each client. This allows the user to hold new client information in a "generic" account until the user decides to create specific accounts for these new clients. Once an account is selected, the format files, hold files, and history data, explained below, associated with the particular account are automatically displayed within the window as described in FIG. 5 below. Select account 80 also allows the user to create new accounts or edit existing account information within the stored accounts 85 for use within any given user session. The process for creating new accounts and editing account information is described in FIG. 6a and FIG. 6b below. After selecting an account at 80, the user initiates select form/hold 90. This function allows the user to select from preformatted format files, to generate new format files for use within any given user session, or to select a hold file. A format file is a file that contains formatting information and predefined fields that allow the user to quickly generate and enter data into a "standard" format or standard "office form." Examples of a standard office form include but are not limited to accounts receivable forms, transmittal forms, retainer agreements, insurance forms, or any form that might require data entry on a repeated basis. Once data has been entered using a given format file, the completed work can be saved as a unique data file and electronically associated with a given account. One advantage for using format files includes having standard formats that can be completed by several users, with each user achieving the same results. A Hold file is a file that has been generated in a previous user session by a user and saved for later review and update. While a file is considered a hold file, it is accessible from the forms/hold/history storage area 95. A user may review and edit a hold file until he is satisfied that the hold file is ready for "permanent" or long term storage where it can be stored in the accounts storage area 85. How a hold file is created, edited and stored is discussed below. It is not necessary that accounts storage area 85 and forms/hold/history storage area 95 be different storage areas as long as the account files, format files, hold files, history files, and data files can be distinguished from one another.

Once the user has selected the desired account and format or hold file, the user may review the hold file and edit it or enter data into the computer using the format from the selected format file. If the user wishes to create a new data file, the user may select a format file and dictate the information he wishes to store into the computer using this format file thereby electronically associating the new data file with the format from the format file. The new data file can then be stored in the computer's memory and each time the file is recalled from memory, it will be displayed using the same format. This allows multiple users to create many sets of data files, each set being associated with a given account or multiple accounts, interspersing different standard forms or formats throughout each set of data files as required. If the user is editing a hold file, the user preferably manipulates the data within the file by uttering voice commands and dictating the data. Voice commands are preferably used to direct the computer to perform tasks. When the user speaks a set of predefined phrases, the translation unit 20 in FIG. 1 correlates the conditioned spoken phrases with commands stored in the operation vocabulary and which CPU 25 in FIG. 1 acts on according to the command's instructions. Dictation within the review/dictate function 100 can be performed using either discrete speech patterns where each word is spoken distinctly with the user leaving a slight pause between each spoken word, or using continuous speech where the user speaks at a "natural,".normal,or conversational pace. Once the review/dictate function 100 is completed, the user may save the new data or hold file as a hold file at logical decision point 105. Alternatively, the user can choose to save the data file or "note" as a completed data file at logical decision point 110. If the user chooses the yes path for hold note 105, the file is saved in the form/hold/history area 95. If the user chooses the yes path for save note 110, the file is saved in the accounts storage area 85. In either event, the user is given the opportunity to enter data into a new account data file or edit a hold file by choosing the yes path for next form/hold/account logical decision point 115 or to end his user session by initiating the no path at 115. If the user decides to follow the yes path at 115 to select account 80, the user can select a new account to work in or if the user wishes to continue to work in the same account the user can verify the account information as displayed and the process is repeated until the user decides to end his user session by initiating exit 120. The user may also end a user session at any time during this sequence by initiating exit 120. It should be noted that this logical sequence is one embodiment of the invention disclosed herein, that the order of steps within this logical sequence is not the only possible sequence order and one can develop other logical sequences that perform the same end result as described above.

Figure 3:
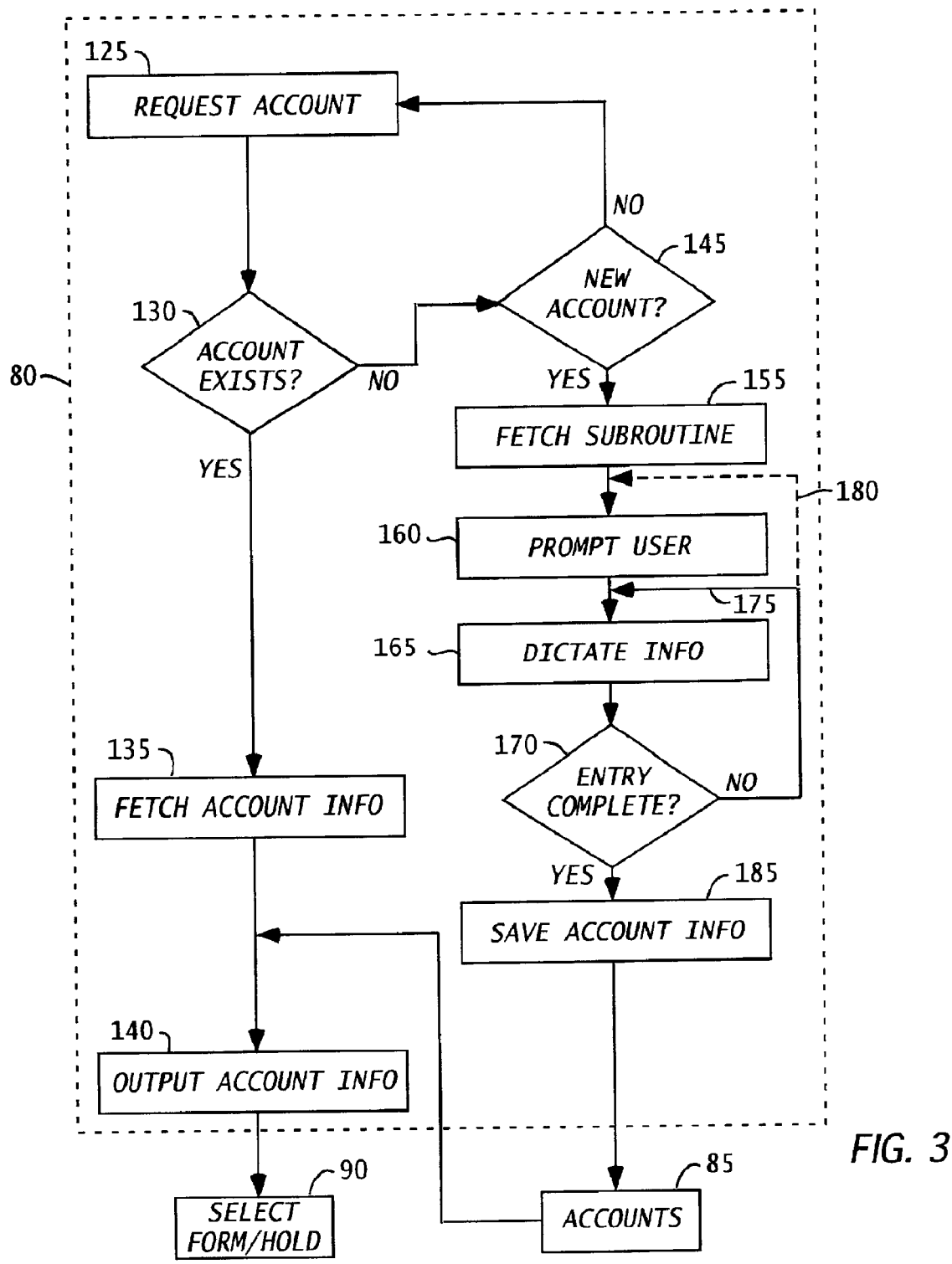
FIG. 3 is a flow diagram of one possible operating sequence for account selection.

FIG. 3 shows one embodiment for the logical sequence used when selecting or creating an account or editing an existing account's information at select account 80. As described above, an account identifies or is electronically associated with all the files that have been created and stored for a given client or patient. Each file in an account is "labeled" or electronically associated with its associated account's information. Also, each data file within an account can contain the associated account information so if the file is viewed on the monitor 30 in FIG. 1 or sent to an output device such as a printer, anyone viewing the file could see the associated account information within the displayed or printed data file. The commands editing within this sequence are preferably performed using voice commands and dictation but can be performed by data entry using the keyboard 35 and mouse 38 in FIG. 1. The user initiates request account 125 by requesting an account using an account number, account name, or some other identification that is unique to a given account. The logical decision point account exists 130 queries the CPU 25 to search its storage areas, including the records unit 43 in FIG. 1 or any device D sub i as described in FIG. 1 above where data can be stored and retrieved by the CPU 25, to find an account file that has the unique attributes as those requested by the user. If the CPU 25 verifies that the account exists, fetch account info 135 is initiated and the account information is output at 140. The user can then choose a format file or hold file at 90 as describe in FIG. 4. This output can be displayed in a window such as the window described in FIG. 5 below. If the CPU 25 does not find a matching account file, the user is prompted and can chose to create a new account file by choosing the yes path at logical decision point 145. If the user does not wish to create a new account file at 145, he can retry his request at 125.

If the user does choose to create a new account by choosing the yes path at logical decision point 145, the user indicates this desire by initiating fetch subroutine 155. The new account data entry window as described in FIG. 6a below is then displayed in a window. The user is then prompted to enter data at 160. The user can enter the new account information by dictating the information at 165. At logical decision point 170, the user can decide that he has not entered all the account information and choose logical path 175 back to continue dictating information. Alternatively, this embodiment may be configured to require certain "minimum" information before the user can add a new account. If the minimum information is not entered, logical decision path 180 is initiated and the user is prompted at 160 to add the remaining minimum account information required before a new account can be added. Once the information has been dictated or entered into the window as described in FIG. 6a below at 170 and no further information is required, the new account information is saved at 185 to accounts storage area 85 and is output, as described in FIG. 5 below, at 140. Once the account has been chosen and displayed, the system can automatically display, as described in FIG. 5, any hold files and history data associated with the given account. Any available format files may also be displayed as described in FIG. 5. It is noted that the account does not need to be selected before the available format files are displayed. The user can then choose a format file or hold file at 90 as described in FIG. 4.

Figure 4:
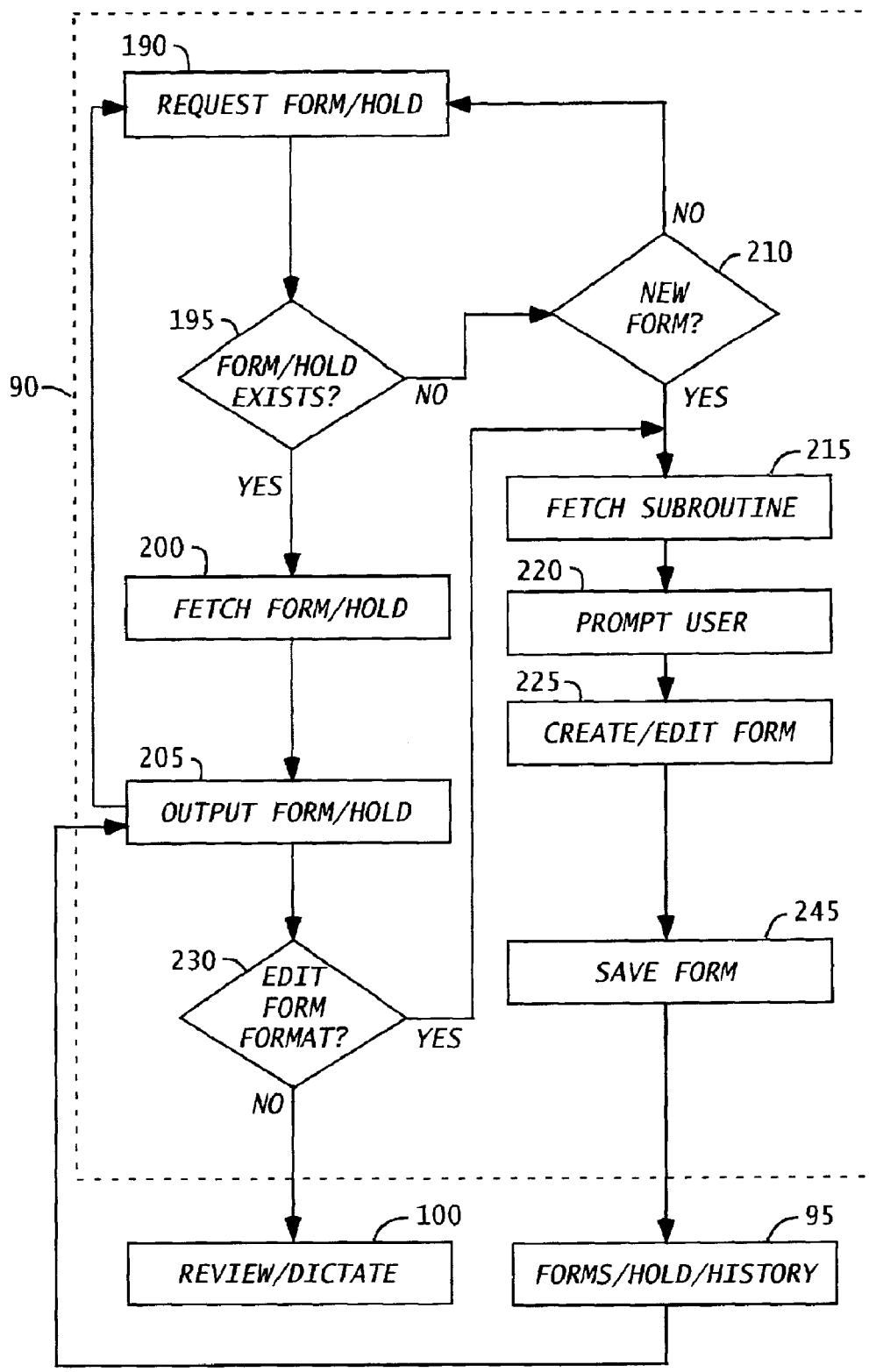
FIG. 4 is a flow diagram of one possible operating sequence for format/hold selection.

FIG. 4 shows a more detailed description of the logical sequence step select form/hold 90. This logical sequence allows the user to request information for display from existing forms, hold files, or to create new forms. The commands within this sequence are preferably performed using voice commands and dictation but can be, as described in FIG. 3 above, substituted by data entry using the keyboard 35 and mouse 38 seen in FIG. 1. The user initiates request form/hold 190 by commanding the computer to open a format or hold file identifying the particular file by file name, its displayed position amongst the other displayed format or hold files, or some other identification that is unique to a given format or hold file. The logical decision point 195 queries the CPU 25 in FIG. 1 to search its storage areas, including the records unit 43 or any device D sub i as described in FIG. 1 above where data can be stored and retrieved by the CPU 25, to find a format or hold file that has the unique attributes as those requested by the user. If the CPU 25 verifies that the format exists, the fetch form/hold block 200 is initiated, and the format file information is output as described in FIG. 5 at output form/hold 205 using the formatting information or form stored in the chosen format file. Format files contain formatting information which include but is not limited to margin settings, paper size, data fields where data can be automatically input from a database such as an account number or client name, data fields where new data can be entered, standard office forms with data fields where new data can be entered, and other document formatting information well known in the art. When a format file is chosen, the formatting is displayed in a window such as the window described in FIG. 5 below and the data entered is displayed using the margin settings, data fields and other such formatting supplied by the format file. When a data file is saved, the formatting is saved within the data file. If the CPU 25 does not find a matching format or hold file, the user can chose to create a new format file by choosing the yes path at logical decision point 210. If the user does not wish to create a new format file at 210, the request form hold 190 is initiated. A format file is preferably selected prior to dictating data into an account, but is not required. The desired data can be dictated into the computer and stored as an unformatted file, electronically associated with an account. Also, a format file or hold file may have no formatting whatsoever, and can be stored as an unformatted file electronically associated with a given account.

If the user chooses to create a new format file at 210, the fetch subroutine 215 is initiated, and the user is prompted at 220 to create the format at 225. The user preferably creates the new format by copying a previously existing format file and editing it. Alternatively, the user can create a format file using standard formatting information as described above or by any means that allows formatting or standard forms to be entered into an electronic database. When the format is complete, the user initiates save form 245, and the new format file is saved at 95. The newly saved format file is then output at 205, and its formatting and file name are displayed as described in FIG. 5 below. Once the format file is displayed as described in FIG. 5 below, the user might decide to edit the format file at 230. The logical sequence for editing a format file is shown in 215 through 245. As above, the subroutine 215 is initiated and the user is prompted to edit the displayed format file. Once the editing is complete at 225, the format file is saved at 245 to 95 and displayed at 205. If the user wishes to create another new format, the user can initiate 190 from 205 and begin the process again. If the user has completed creating and editing formats, the user can move onto review/dictate 100.

Figure 5:
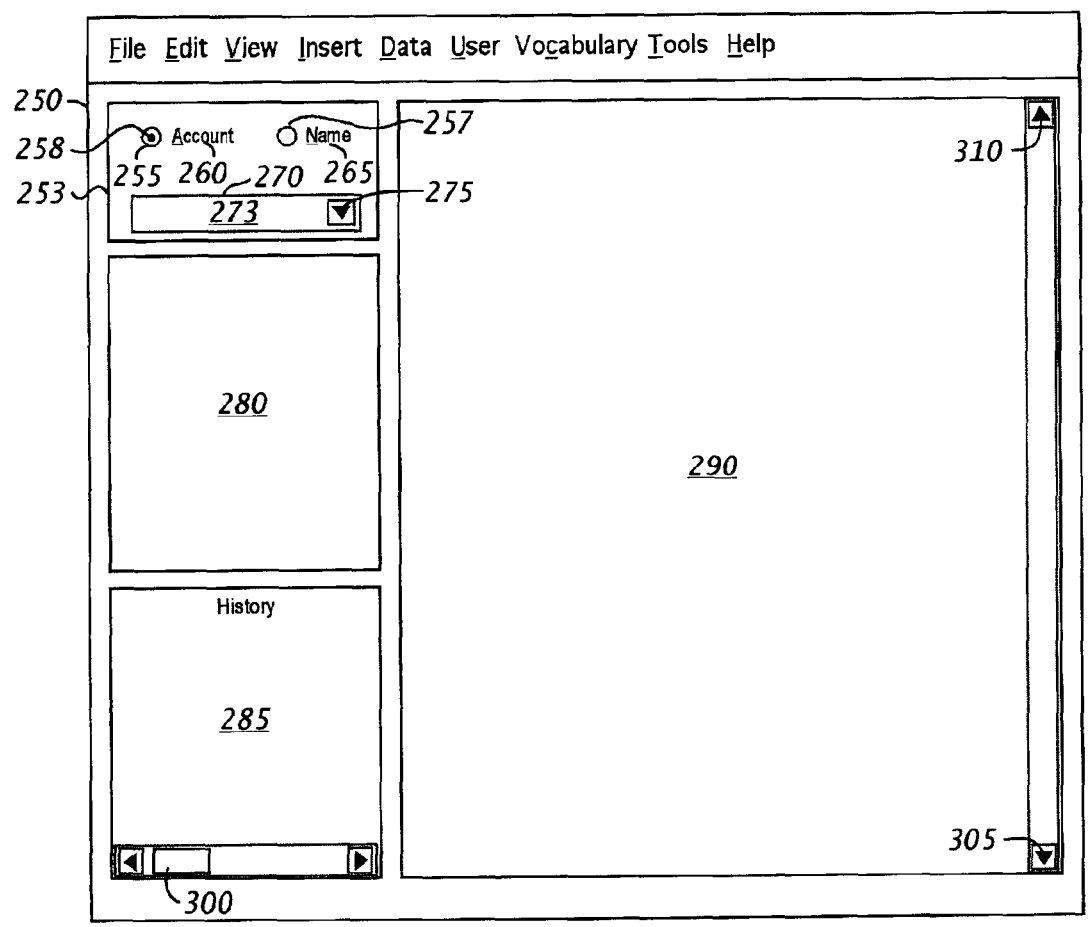
FIG. 5 illustrates one possible access window for the present invention.

FIG. 5 shows one embodiment for a window 250 used for entering and manipulating data. Window 250 is partitioned into several smaller windows or "subwindows", each subwindow containing information pertinent to a user during any given user session. These subwindows can include account information area 253, format selection area 280, history area 285, and dictation area 290. Account information area 253 includes account information pull down menu 270. Within the account information pull down menu 270, is the client account information 273 and the pull down menu selection arrow 275. The user can choose to list the client account information at 273 by either account number 260 or by account name 265. The user can make this selection preferably using voice commands, or by using command typed into keyboard 35 in FIG. 1, or by clicking the mouse 38 in FIG. 1. In this embodiment, the user selects the account using voice commands by verbally requesting the account number or account name. The user can display the account information by account name or account number by verbally requesting this display preference. The account information is then displayed in 273 and indicator circles 255 or 257 are highlighted by highlighting circle 258 depending on the preference selected by the user. When using a mouse, the user can click on the center of the indicator circle 255 and highlighting circle 258 will appear. To select account information by account name 265 the user can click indicator circle 257 and highlighting circle 258 would appear in that area. Highlighting circle 258 is present in only one indicator circle 255 or 257 at a time. As shown in FIG. 5, account information box 253, indicator circle 255 is selected to show account information 273 by account number 260. If the requested account information exists, it is displayed in account information 273, the available format files are listed in 280, the associated hold files are listed in 280, and the associated account history data is displayed in 285. As disclosed above, the format files can be listed prior to account selection. The account history for a given account is a listing of statistics or "history data" on all data files that have been created and associated with a given account. This history data is stored in a history file that is electronically associated with a given account. A "scroll" bar 300 is shown at the bottom of the history selection area. The history selection area 285 contains statistics or account information in rows and columns where each row displays a given file's statistics and each column within a row displays specific statistics associated with the given file such as file name, date modified, format used, and short descriptions. This information can also be arranged so that each column displays a given file's statistics and each row within a column displays specific statistics associated with the given file. These statistics can be arranged in any fashion and can include less information or more information then described above. The user can chose to display a stored data file associated with a given account by double clicking on the file name within history selection area 285 using the mouse 38 in FIG. 1 or by using voice commands to select a given row or column associated with a given stored data file. The scroll bar 300 can be used to view all the columns within history selection area 285. Another vertical scroll bar, not shown, can be used to show all the rows within history selection are 285 if the number of rows displayed cannot be displayed within the subwindow as it is displayed. Dictation area 290 is where the chosen format file information is displayed for dictation. Within dictation area 290 the format can automatically display predetermined information such as account name, firm name, user name, account number, date, and any other predefined information even if that information changes over time. During dictation, the user uses voice commands to "navigate" around the formatted dictation area and enters data at appropriate places as defined by the preformatted format file. The scroll bar arrows 305 and 310 allow the user to view the content of a data file, format file, or partially completed data file within dictation area 290 by "moving" up and down the file contents so the user can see any data that does not fit into the top and bottom boundaries of 290 but exists in the given file. Another horizontal scroll bar, not shown, can be used to view all the content of the displayed file that does not fit into the left and right boundaries of 290. It is noted that this embodiment does not require all the displayed information to be displayed in a single window consisting of subwindows, as is preferred in the description above. The same information could be displayed in multiple, separate windows that could be simultaneously active or overlapped, giving the user flexibility to "move" windows around. It is also noted that the location of any given subwindow is not important, and the size of each window could be varied depending on the user's desires. It is preferable, though, that dictation area 290 is sufficiently large for the user to view several lines of the displayed words as they are displayed in the subwindow during dictation. When a user wishes to add or edit account information, the user preferably uses voice commands to initiate the subroutine 155 in FIG. 3 and the account information data entry window 317 is displayed as described in FIG. 6a and FIG. 6b.

FIG. 6a shows one embodiment of an account information data entry window 317. Window 317 is preferably partitioned into several smaller windows or subwindows, each subwindow containing data entry areas for entering data to uniquely identify an account. It is preferable that the minimum number of subwindows include at least an account number 320, client first name 325, and client last name 335. Necessary or minimal data can be indicated using underlining 440, gray scaling within required "subwindows" or "blinking" subwindows, or any other technique that "highlights" the required data entry subwindows. The additional subwindows shown in this embodiment include client middle name 330, date of birth 340, sex 345, address line #1 350, address line #2 355, city 360, state 365, zip code 370, work phone 375, home phone 380, professional ID 385, referring professional's ID 390, and client ID 405. Client ID 405 can be a unique number that is correlated to a professional and the particular client where there are more than one professionals using the same account databases, such as in a professional practice or firm. Additional windows insurance ID 395 and insurance account number 400 can be added as appropriate for a given professionals needs. Additional subwindows can also be added and existing windows can be deleted depending on the particular needs of a given professional. As stated above, each of these subwindows could be displayed in separate windows or any combination of windows with subwindows, but displaying all subwindows within one window 317 is preferred. The user completes the information within each subwindow preferably using voice commands and dictation. Once the desired data has been entered, subject to the minimum data entry requirements, described in FIG. 3 above, the user can add the new account by initiating the "add button" 410. If the user decides to edit existing account information, he selects a particular account from subwindow 253, as described in FIG. 5 above. Once the account is chosen, the associated account information is displayed in the subwindows 320 through 405 within window 323. At this moment, the account information is preferably displayed in a "read only" form to help prevent inadvertent changes to account information. To edit the information, the user initiates the edit button 415, and the displayed data is now available for editing. Buttons 450 and 455 as shown in FIG. 6b replaces buttons 410 through 430. The user then edits the account information as desired and initiates button 450 to save the changes. If the user decides not to save the changes, the user initiates button 455. Once either 450 or 455 in FIG. 6b are initiated, the window returns to the FIG. 6a configuration. The user may also delete account information by selecting a particular account from 253 and initiating button 420. The use of buttons 415 and 420 can be limited. Where multiple persons have access to the account information, access to 415 and 420 can be limited through "password protection." For a user to successfully initiate these buttons, he might be prompted to enter a special code or his "user account information." If the user's entry does not match with the entry required to complete initiation of 415 and 420, neither task will be completed and the account information will remain unchanged. Many other protective steps, which are well known in the industry may be taken throughout this embodiment to protect all electronic data. Refresh button 425 is provided for those times when account data has been displayed in window 317 and is changed by another user with access to accounts 85 data, as shown in FIG. 2. Refresh 425 is initiated to display any changes that may have been made by another user. This allows any user to have the latest account information. Once the user has completed adding new accounts or editing existing accounts, he can return to window 250 in FIG. 5 by initiating the close button 430. It is noted that every operation within this embodiment, if not mentioned earlier, can be performed using voice commands.

The embodiments of the invention described herein are only for purposes of illustration and understanding of the invention. Other embodiments of this invention can be devised which do not depart from the spirit of the invention as disclosed herein. Accordingly, the invention shall be limited in scope only by the attached claims.

What is claimed is:

1. A method for entering and displaying data in a computer by means of a human voice comprising:

generating and displaying a window, generating a first sequence of user utterances for performing an operation, generating a second sequence of user utterances for entering data, receiving said first sequence of user utterances and said second set of user utterances in a microphone, converting said first set of user utterances into a first conditioned input signal and said second set of user utterances into a second conditioned input signal, providing a stored operation vocabulary, providing a stored dictation vocabulary, correlating said first conditioned input signal with elements of said stored operation vocabulary thereby translating said first sequence of user utterances into compatible instructions recognizable by said computer, and correlating said second conditioned input signal with elements of said stored dictation vocabulary thereby translating said second sequence of user utterances into data, providing a plurality of accounts, selecting a first account from said plurality of accounts using said first sequence of user utterances, electronically associating said data with said first account, generating a plurality of subwindows within the boundaries of said window, wherein a second of said subwindows is an account information area, displaying said data within the boundaries of a first subwindow, and displaying said first account information within the boundaries of said second window.

2. The method as defined by claim 1 wherein said first sequence of user utterances and said second sequence of user utterances are generated using discrete speech.

3. The method as defined by claim 1 wherein said first sequence of user utterances and said second sequence of user utterances are generated using continuous speech.

4. The method as defined by claim 1 wherein said first sequence of user utterances and said second sequence of user utterances are generated by a live human.

5. The method as defined by claim 1 wherein said plurality of accounts is created by said user using said first sequence of user utterances and said second sequence of user utterances.

6. The method as defined by claim 1 wherein said plurality of accounts is edited by said user using said first sequence of user utterances and said second sequence of user utterances.

7. The method as defined by claim 1 wherein said first subwindows is a dictation area.

8. The method as defined by claim 1 further including displaying a plurality of preformatted format files within the boundaries of a third of said subwindows.

9. The method as defined by claim 1 further including displaying history data within the boundaries of a third of said subwindows.

10. The method as defined by claim 1 further including recording a second set of user utterances,
 playing back said recording, and
 receiving said second set of user utterances using a line input.

11. The method as defined in claim 1 further including providing a database, and
 storing said data in said database.

12. The method as defined by claim 11 further including providing a plurality of preformatted format files, and
 storing said format files in said database.

13. The method as defined by claim 12 further including selecting one of said preformatted format files using said first sequence of user utterances, and
 displaying said data in said first subwindow using said format file.

14. The method as defined by claim 13 further including electronically associating one of said preformatted format files with said data, and
 saving said associating in said database so said data is displayed using the same one of said preformatted format files each time said data is displayed in said first subwindow.

15. The method as defined by claim 12 further including selecting a first format file of said preformatted format files,
 editing said first format file using said first sequence of user utterances and said second sequence of user utterances,
 storing said edited format file in said database, and
 displaying said data in said first subwindow using said edited format file.

16. The method as defined by claim 1, further including recording a user session,
 storing said recording within said computer memory,
 selecting said user session from said computer memory,
 providing a database, and
 selectively replaying said user session through the interface between the computer CPU and the translation unit and back thereby recreating selected portions of said user session.

17. The method as defined by claim 16, further including broadcasting the replay of said user session through a speaker connected to said computer, and
 editing selected portions of said user session.

18. The method as defined by claim 1, farther including recording a user session,
 storing said recording within a mass storage device,
 selecting said user session from said mass storage device, and
 selectively replaying said user session through the interface between the computer CPU and the translation unit and back thereby recreating selected portions of said user session.

19. The method as defined by claim 18, further including broadcasting the replay of said user session through a speaker connected to said computer, and
 editing selected portions of said user session.

20. A voice controlled computer interface system for entering data into a computer comprising:
 a first sequence of user utterances requiring input by a user in order to perform an operation,
 a second sequence of user utterances requiring input by a user in order to enter data into a computer,
 a microphone into which said first sequence of user utterances and said second sequence of user utterances are introduced,
 a conditioning circuit for forming a first conditioned input signal from said first sequence of user utterances and a second conditioned input signal from said second sequence of user utterances,
 a stored operation vocabulary,
 a stored dictation vocabulary;
 a translation unit for correlating said first conditioned input signal with elements of said stored operation vocabulary thereby creating compatible instructions recognizable by said computer, and for correlating said second conditioned input signal with elements of said stored dictation vocabulary thereby translating said second conditioned input signal into data,
 a plurality of accounts,
 said data being electronically associated with a first account of said accounts,
 said first account being selectable by said first sequence of user utterances,
 a window wherein said data is displayed,
 a plurality of subwindows displayed within the boundaries of said window,
 wherein said data is displayed within the boundaries of a first of said subwindows, and
 wherein a second of said subwindows is an account information area in which said first account is displayed.

21. The voice controlled computer interface system of claim 20, wherein said first sequence of user utterances and said second sequence of user utterances is discrete speech.

22. The voice controlled computer interface system of claim 20, wherein said first sequence of user utterances and said second sequence of user utterances is continuous speech.

23. The voice controlled computer interface system of claim 20, wherein said first sequence of user utterances and said second sequence of user utterances are generated by a live human.

24. The voice controlled computer interface system of claim 20, wherein said plurality of accounts is created by said user using said first sequence of user utterances and said second sequence of user utterances.

25. The voice controlled computer interface system of claim 20, wherein one of said plurality of accounts is edited by said user using said first sequence of user utterances and said second sequence of user utterances.

26. The voice controlled computer interface system of claim 20, wherein one of said subwindows is a dictation area in which said data is displayed.

27. The voice controlled computer interface system of claim 20, wherein said first subwindow is a dictation area in which said data is displayed.

28. The voice controlled computer interface system of claim 20, wherein one of said subwindows is a format selection area.

29. The voice controlled computer interface system of claim 28, further comprising a plurality of preformatted format files, and wherein said format files are displayed within said format selection area.

30. The voice controlled computer interface system of claim 20, wherein one of said subwindows is a history area.

31. The voice controlled computer interface system of claim 30, further comprising a history file, and
wherein history data from said history file is displayed within said history area.

32. The voice controlled computer interface system of claim 20, further comprising a plurality of preformatted format files, and
wherein said data is displayed in said first subwindow using one of said format files.

33. The voice controlled computer interface system of claim 32, wherein one of said format files is selected from said plurality of preformatted format files using said first sequence of user utterances.

34. The voice controlled computer interface system of claim 32, wherein said format files are created by said user.

35. The voice controlled computer interface system for claim 32, wherein said format files are edited by said user.

36. The voice controlled computer interface system of claim 20, further comprising a hold file,
said hold file being electronically associated with a first account of said accounts, and
wherein said hold file is stored within said database.

37. The voice controlled computer interface system of claim 20, further comprising a first plurality of hold files electronically associated with a second account of said accounts,
a second plurality of hold files electronically associated with a third account of said accounts, and
wherein said first plurality of hold files and said second plurality of hold files are stored within said database.

38. A voice controlled computer interface system for entering data into a computer comprising:
a first sequence of user utterances requiring input by a user in order to perform an operation,
a second sequence of user utterances requiring input by a user in order to enter data into a computer,
a microphone into which said first sequence of user utterances and said second sequence of user utterances are introduced,
a conditioning circuit for forming a first conditioned input signal from said first sequence of user utterances and a second conditioned input signal from said second sequence of user utterances,
a stored operation vocabulary,
a stored dictation vocabulary;
a translation unit for correlating said first conditioned input signal with elements of said stored operation vocabulary thereby creating compatible instructions recognizable by said computer, and for correlating said second conditioned input signal with elements of said stored dictation vocabulary thereby translating said second conditioned input signal into data,
a plurality of accounts,
said data being electronically associated with a first account of said accounts,
said first account being selectable by said first sequence of user utterances,
a window,
a plurality of subwindows displayed within the boundaries of said window,
a first subwindow of said subwindows being a dictation area wherein said data is displayed,
a second subwindow of said subwindows being an account information area wherein a first account of said accounts is displayed,
a plurality of preformatted formats wherein said data is displayed in said first subwindow using one of said formats, and
a database wherein said data is electronically associated with one of said accounts and one of said formats, and
wherein said data is stored said database.

39. A method for entering and displaying data in a computer by means of a human voice comprising:
generating and displaying a window,
generating a first sequence of user utterances for performing an operation,
generating a second sequence of user utterances for entering data,
receiving said first sequence of user utterances and said second set of user utterances in a microphone,
converting said first set of user utterances into a first conditioned input signal and said second set of user utterances into a second conditioned input signal,
providing a stored operation vocabulary,
providing a stored dictation vocabulary,
correlating said first conditioned input signal with elements of said stored operation vocabulary thereby translating said first sequence of user utterances into compatible instructions recognizable by said computer, and correlating said second conditioned input signal with elements of said stored dictation vocabulary thereby translating said second sequence of user utterances into data,
displaying said data in said window,
providing a plurality of accounts,
selecting a first account from said plurality of accounts using said first sequence of user utterances,
electronically associating said data with said first account,
providing a database,
storing said data in said database,
storing a plurality of sets of data within said database,
wherein a first set of said sets is electronically associated with a second account of said accounts,
wherein a second set of said sets is electronically associated with a third account of said accounts, and
selecting said second account and said third account by using said first sequence of user utterances.

40. The method as defined by claim 39 further including providing a plurality of history files,
wherein a first history file of said history files is electronically associated with a first set of said sets and said second account of said accounts,
wherein a second history file of said history files is electronically associated with a second set of said sets and said third account of said accounts, and
storing said first history file and said second history file in said database.

41. The method as defined by claim 40 further including generating a plurality of subwindows within the boundaries of said window,
wherein a first of said subwindows is a dictation area,
wherein a second of said subwindows is an account information area, wherein a third of said subwindows is a format selection area, wherein a forth of said subwindows is a history area, selecting a second account using said first sequence of user utterances, automatically displaying the account information from said second account in said account information area, and automatically displaying the history data from said first history file in said history area.

42. The method as defined by claim 41 further including selecting a saved data file from said history area, and displaying said saved data file in said dictation area.

43. The method as defined by claim 40 further including generating a plurality of subwindows within the boundaries of said window, wherein a first of said subwindows is a dictation area, wherein a second of said subwindows is an account information area, wherein a third of said subwindows is a format selection area, wherein a forth of said subwindows is a history area, providing a first plurality of hold files, electronically associating said first plurality with a second account of said accounts, providing a second plurality of hold files, electronically associating said second plurality with a third account of said accounts, storing said first plurality of hold files and said second plurality of hold files in said database, selecting a second account of said accounts using said first sequence of user utterances, automatically displaying said second account in said account information area, automatically displaying the history data from said first history file in said history area, and automatically displaying said first plurality of hold files in said format selection area.

44. The method as defined by claim 43 further including selecting a saved data file from said history area, and displaying said saved data file in said dictation area.

45. A voice controlled computer interface system for entering data into a computer comprising:

a first sequence of user utterances requiring input by a user in order to perform an operation, a second sequence of user utterances requiring input by a user in order to enter data into a computer, a line input into which said first sequence of user utterances and said second sequence of user utterances are introduced, a conditioning circuit for forming a first conditioned input signal from said first sequence of user utterances and a second conditioned input signal from said second sequence of user utterances, a stored operation vocabulary, a stored dictation vocabulary;

a translation unit for correlating said first conditioned input signal with elements of said stored operation vocabulary thereby creating compatible instructions recognizable by said computer, and for correlating said second conditioned input signal with elements of said stored dictation vocabulary thereby translating said second conditioned input signal into data, a plurality of accounts, said data being electronically associated with a first account of said accounts, said first account being selectable by said first sequence of user utterances, a window wherein said data is displayed, and a recording of a human voice wherein said second sequence of user utterances are generated from the playback of said recording into said line input.

46. The voice controlled computer interface system of claim 45, wherein said recording is a user session wherein said user utterances are recorded as a first sequence of user utterances combined with said second sequence of user utterances and said combined user utterances are generated from the playback of said recording into said line input.

47. A voice controlled computer interface system for entering data into a computer comprising:

a first sequence of user utterances requiring input by a user in order to perform an operation, a second sequence of user utterances requiring input by a user in order to enter data into a computer, a microphone into which said first sequence of user utterances and said second sequence of user utterances are introduced, a conditioning circuit for forming a first conditioned input signal from said first sequence of user utterances and a second conditioned input signal from said second sequence of user utterances, a stored operation vocabulary, a stored dictation vocabulary;

a translation unit for correlating said first conditioned input signal with elements of said stored operation vocabulary thereby creating compatible instructions recognizable by said computer, and for correlating said second conditioned input signal with elements of said stored dictation vocabulary thereby translating said second conditioned input signal into data, a plurality of accounts, said data being electronically associated with a first account of said accounts, said first account being selectable by said first sequence of user utterances, a window wherein said data is displayed, a database, a plurality of preformatted format files, wherein said data is electronically associated with a first account of said accounts and a first format of said format files, wherein said data is displayed in said window using said format file each time said data is displayed, wherein said data, said accounts, and said format files are stored within said database, a plurality of sets of data stored within said database, wherein a set of data within said sets is made up of a plurality of saved data files, wherein a first set of said sets is electronically associated with a second account of said accounts, wherein a second set of said sets is electronically associated with a third account of said accounts, and wherein said second account and said third account is selectable by said first sequence of user utterances.

48. The voice controlled computer interface system of claim 47, further comprising a history file electronically associated with a first set of said sets and a second account of said accounts, and wherein said history file is stored within said database.

49. The voice controlled computer interface system of claim 47, further comprising a plurality of history files, wherein a first history file of said history files is electronically associated with a first set of said sets and said second account of said accounts, wherein a second history file of said history files is electronically associated with a second set of said sets and said third account of said accounts, and wherein said first history file and said second history file are stored within said database.

50. The voice controlled computer interface system of claim 49, further comprising a plurality of subwindows displayed within the boundaries of said window, wherein a first of said subwindows is a dictation area, wherein a second of said subwindows is an account information area, wherein a third of said subwindows is a format selection area, wherein a forth of said subwindows is a history area, wherein a second account of said accounts is selectable using said first sequence of user utterances, and wherein the selection of said second account automatically leads to the display of said second account in said account information area, and the history data from said first history file in said history area.

51. The voice controlled computer interface system of claim 50, wherein said history data contains statistics relating to all the saved data files within said first set of said sets, and wherein one of said saved data files is displayed in said diction area upon selection of said statistics associated with said one of said data files.

52. The voice controlled computer interface system of claim 49 further comprising a first plurality of hold files electronically associated with a second account of said accounts, a second plurality of hold files electronically associated with a third account of said accounts, wherein said first plurality of hold files and said second plurality of hold files are stored within said database, a plurality of subwindows displayed within the boundaries of said window, wherein a first of said subwindows is a dictation area, wherein a second of said subwindows is an account information area, wherein a third of said subwindows is a format selection area, wherein a forth of said subwindows is a history area, wherein a second account of said accounts is selectable using said first sequence of user utterances, and wherein the selection of said second account automatically leads to the display of said second account in said account information area, the history data from said first history file in said history area, and said first plurality of hold files within said format selection area.

53. The voice controlled computer interface system of claim 52, wherein said history data contains statistics relating to all the saved data files within said first set of said sets, and wherein one of said saved data files is displayed in said diction area upon selection of said statistics associated with said one of said data files.

* * * * *